(No Model.)

C. E. W. WOODWARD.
CYCLE WHEEL.

No. 477,397. Patented June 21, 1892.

Witnesses
J. H. Shumway
Lillian D. Kelsey

Charles E. W. Woodward
Inventor
By atty
Earle Seymour

THE NORRIS PETERS CO., PHOTO-LITHO., WASHINGTON, D. C.

UNITED STATES PATENT OFFICE.

CHARLES E. W. WOODWARD, OF CHICOPEE FALLS, MASSACHUSETTS, ASSIGNOR TO THE OVERMAN WHEEL COMPANY, OF SAME PLACE AND HARTFORD, CONNECTICUT.

CYCLE-WHEEL.

SPECIFICATION forming part of Letters Patent No. 477,397, dated June 21, 1892.

Application filed April 11, 1892. Serial No. 428,627. (No model.)

*To all whom it may concern:*

Be it known that I, CHARLES E. W. WOODWARD, of Chicopee Falls, in the county of Hampden and State of Massachusetts, have invented a new Improvement in Cycle-Wheels; and I do hereby declare the following, when taken in connection with accompanying drawings and the letters of reference marked thereon, to be a full, clear, and exact description of the same, and which said drawings constitute part of this specification, and represent, in—

Figure 1:
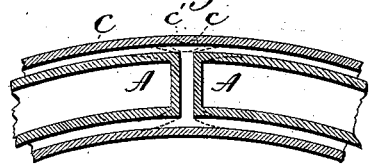
Figure 2:
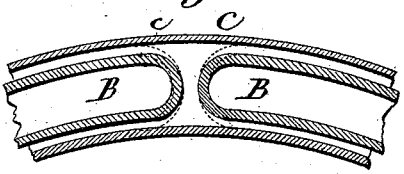
Figure 3:
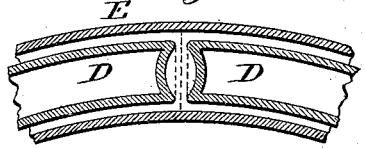
Figure 4:
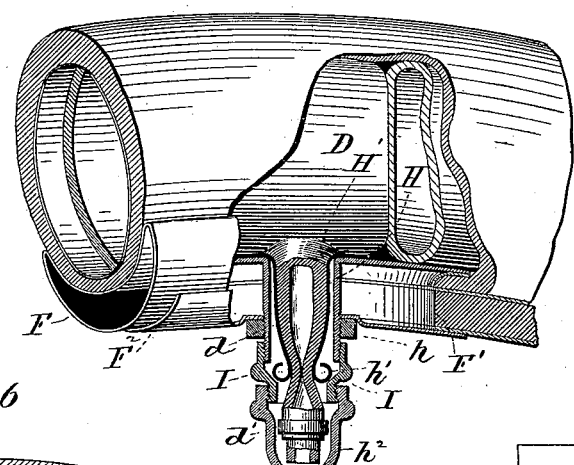
Figure 6:
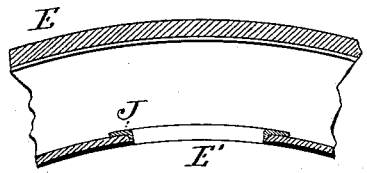
Figure 5:
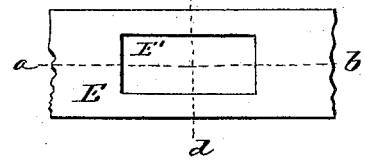
Figure 8:
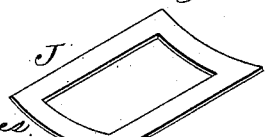
Figure 7:
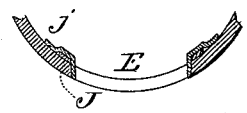

Figures 1 and 2, views in the nature of diagrams showing the abutting ends of removable inner air-tubes as heretofore constructed; Fig. 3, a view of the same nature showing my improvement in one of its forms; Fig. 4, a broken perspective view of a section of a wheel rim and tire constructed in accordance with my invention; Fig. 5, a broken detached view, in inside elevation, of a section of the tire, showing the opening therein; Fig. 6, a view thereof in longitudinal section on the line $a\,b$ of Fig. 5; Fig. 7, a view of the tire in transverse section on the line $c\,d$ of the same figure; Fig. 8, a detached perspective view of the open frame which is attached to the inner face of the tire around the said opening.

My invention relates to an improvement in that class of cycle-wheels having pneumatic tires, the object being to increase their efficiency and durability and to avoid some objections inherent in such wheels as now constructed.

With these ends in view my invention consists in two parts: in its first part in a removable inner air-tube having closed, concave, or slack ends approximating in area to the cross-sectional area of the body of the tube when it is inflated, and in its second part in a frame for reinforcing the doorway or opening formed in the inner periphery of the tire for the introduction and removal of the inner air-tube.

My invention further consists in certain details of construction and combinations of parts, as will be hereinafter described, and pointed out in the claims.

With reference to the first part of my invention I would state that heretofore the ends of removable inner air-tubes have been made square or rounded, and have exercised a restraining action against the expansion of the ends of the tubes when the same are inflated. After the inflation of such a tube having square or rounded ends the same are therefore smaller than it is at other points and tapering in form, so that an annular space is left between them and the tire in which the tube is contained, whereby the tire, being unsupported over the ends of the tube, falls into the said space and presents an unsightly exterior depression, and there being a lesser body of compressed air in the said ends of the tube to sustain the weight of the machine and rider he will be conscious with every revolution of the wheel that the pressure of the air within the tire is not uniform, and this of course detracts from his pleasure.

In illustration of the foregoing I wish to call attention to Figs. 1 and 2 of the drawings, which show two forms of air-tubes as heretofore constructed, both being objectionable for the reasons stated in the foregoing paragraph. In Fig. 1 of the drawings I have shown a tube having square ends A A, (represented in full lines as they appear when deflated and by broken lines as they appear when inflated.) Fig. 2 of the drawings shows in the same manner a tube having rounded ends B B. It will be noticed that when the tubes shown by these figures are inflated they fill and completely occupy the tires C C by which they are contained, except at their ends, which so far restrain inflation that when the tubes are inflated their ends are tapered, leaving unoccupied annular spaces $c\,c$ around them. The tires C C being unsupported at these points are depressed into the said spaces $c\,c$, as indicated at $c'\,c'$ in the drawings. These depressions are visible from the outside of the tires and give the same an unsightly appearance, and more than that the internal pressure of air being less around at these points than elsewhere the weight of the machine and rider is not so well supported, and he is conscious of a slight break in the continuity of the cushioning action of the tire at every revolution of the wheel, which becomes therefore less pleasurable for him to ride. I avoid the objections above referred to and illustrated in the said figures of the drawings by constructing the tubes with concave slack ends approximating in area to the cross-sectional area of the tubes when inflated. Thus in Fig. 3 of the drawings the ends D D of the tube are shown in full lines to be deflated and concaved and by broken lines to be inflated and squarely abutted against each other, so as to completely occupy and fill the tire E at the point of their abutment. I may mention here that the concaved portions of the rubber, when subjected to the pressure of compressed air, help to push out and expand the ends of the tubes. It will thus be seen that under my invention by making the ends of the tubes concave I completely avoid the objections pointed out in the tubes as now constructed.

The particular concave formation of the ends of the tube may be varied as desired, the only requirement being that they shall have enough of slack to permit them to expand uniformly with the other portions of the tube. The figures of the drawings already described are in the nature of diagrams, but Fig. 4 shows in broken perspective a section of a wheel-rim having a pneumatic tire E, containing my improved tube, constructed with concaved ends D D. One of the said ends has connected with it a lateral rubber tube $d$, through which it is inflated, and which is provided with a nipple $d'$ for its connection with the apparatus of inflation. The wheel-rim F (shown in this figure) is provided with an opening or port F', through which the air-tube is introduced and removed, the tire E having a corresponding port E', as shown by Fig. 5 of the drawings. When the tube is in place within the tire, its small inflation-tube $d$, which projects inwardly through the opening E' in the tire and the port F' in the rim, is inclosed by an externally-threaded sleeve H, formed midway the length of a transversely-bowed plate H', which is introduced within the tire and withdrawn therefrom through the opening F' in the rim and the opening E in the tire by canting it. When in position, its ends extend over the portions of the tire adjacent to the ends of the opening E' thereof. The opening in the rim is normally closed by a transversely-bowed plate $F^2$, held against the outer face of the rim over the said opening by means of a nut $h$. A collar $h'$, screwing over the end of the said sleeve, is constructed with a bevel $h^2$, which engages with the free ends of two spring-recovered compressors I I, having their outer ends secured to the plate H', and located within the sleeve to compress them upon the tube $d$, and so close the same. I do not, however, claim the said spring-recovered compressors, which are the invention of another. A cap $h^2$ screws onto the outer end of the said nut $h'$ and incloses the extreme end of the inflation-tube $d$ and the nipple $d'$ thereof. I do not, of course, limit the use of my invention to the particular construction shown by Fig. 4, which I have shown simply to illustrate one application of my improved inner air-tube.

The second part of my invention is shown by Figs. 5 to 8, inclusive, of the drawings, and is designed to prevent expansion and displacement of the tire around the opening E', formed in it in alignment with the opening F in the rim, as before described. I employ for this purpose a rectangular open oblong frame J, transversely bowed and having its sides firmly attached to the inner face of the tire by fabric $j$, lapped over them, as shown by Fig. 7 of the drawings, and attached to or made integral with the tube, as desired. This frame is itself firmly held in place by the engagement with it of the ends of the plate H', and by attaching the tire to the plate the tire is also prevented from displacement around the edges of the opening E', the lateral pressure upon the tire at this point tending to tear it away from the rim, however firmly it may be cemented thereto. My improved frame is especially effective in preventing the lateral expansion of the tire around its said opening E'.

I would have it understood that I do not limit myself to the exact construction herein shown and described, but hold myself at liberty to make such changes and alterations therein as fairly fall within the spirit and scope of my invention.

Having fully described my invention, what I claim as new, and desire to secure by Letters Patent, is—

1. A removable inner air-tube for pneumatic wheel-tires, having closed concave or slack ends approximating in area to the cross-sectional area of the body of the tube when it is inflated, substantially as set forth, and whereby the tube expands uniformly from end to end.

2. A removable inner air-tube for pneumatic wheel-tires, having closed concave or slack ends approximating in area to the cross-sectional area of the body of the tube when it is inflated, one of the said ends being provided with a small lateral inflation-tube, substantially as set forth, and whereby the tube extends uniformly from end to end.

3. In a cycle-wheel, the combination, with the rim thereof constructed with an opening in its inner periphery, of a tire having its inner periphery constructed with an opening corresponding to that in the rim, an open frame located within the tire and secured to the inner face thereof around the said opening therein, a removable inner air-tube adapted to be introduced into and withdrawn from the tire through the opening in it and the opening in the rim, and means for connecting the said frame with the rim through the said openings, substantially as described.

4. In a wheel, the combination, with the rim thereof constructed with an opening in its inner periphery, of a tire having its inner periphery constructed with an opening corresponding to that in the rim, an open rectangular oblong transversely-bowed frame located within the tire and secured by its sides to the inner face thereof around the said opening therein, a removable inner air-tube adapted to be introduced into and withdrawn from the tire through the said opening therein and the opening in the rim, and means for connecting the said frame with the rim through the opening in it and the opening in the tire, substantially as described.

In testimony whereof I have signed this specification in the presence of two subscribing witnesses.

CHARLES E. W. WOODWARD.

Witnesses:
G. H. POWELL,
J. W. DOLEN.